(12) United States Patent
Owens et al.

(10) Patent No.: US 10,494,090 B2
(45) Date of Patent: Dec. 3, 2019

(54) ROTOR HUB WITH STRUCTURAL REINFORCEMENTS

(71) Applicant: Bell Helicopter Textron Inc., Fort Worth, TX (US)

(72) Inventors: Jason C. Owens, Lewisville, TX (US); Frank B. Stamps, Colleyville, TX (US); Andrew Paul Haldeman, Fort Worth, TX (US); Robert P. Wardlaw, Keller, TX (US); John R. McCullough, Weatherford, TX (US); Gary Miller, North Richland Hills, TX (US); Andrew Ryan Maresh, Hurst, TX (US); Drew A. Sutton, Georgetown, KY (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 274 days.

(21) Appl. No.: 15/699,677

(22) Filed: Sep. 8, 2017

(65) Prior Publication Data

US 2019/0077502 A1 Mar. 14, 2019

(51) Int. Cl.
*B64C 27/51* (2006.01)
*B64C 27/48* (2006.01)
*B64C 27/35* (2006.01)
*F16C 27/00* (2006.01)

(52) U.S. Cl.
CPC .............. *B64C 27/35* (2013.01); *B64C 27/48* (2013.01); *B64C 27/51* (2013.01); *F16C 27/00* (2013.01); *F16C 2326/43* (2013.01)

(58) Field of Classification Search
CPC .......... B64C 27/33; B64C 27/35; B64C 27/51
See application file for complete search history.

(56) References Cited

U.S. PATENT DOCUMENTS

| | | | | |
|---|---|---|---|---|
| 4,427,340 A | * | 1/1984 | Metzger | B64C 27/51 416/134 A |
| 8,444,382 B2 | * | 5/2013 | Stamps | B64C 27/37 416/1 |
| 9,457,897 B2 | * | 10/2016 | Sutton | B64C 27/33 |

* cited by examiner

*Primary Examiner* — Richard A Edgar
(74) *Attorney, Agent, or Firm* — Patent Capital Group

(57) ABSTRACT

In one embodiment, a rotor hub comprises a hub plate, a yoke for attaching a plurality of rotor blades, a plurality of yoke support bearings, and a plurality of cushioned damper bearings for attaching a plurality of dampers.

19 Claims, 16 Drawing Sheets

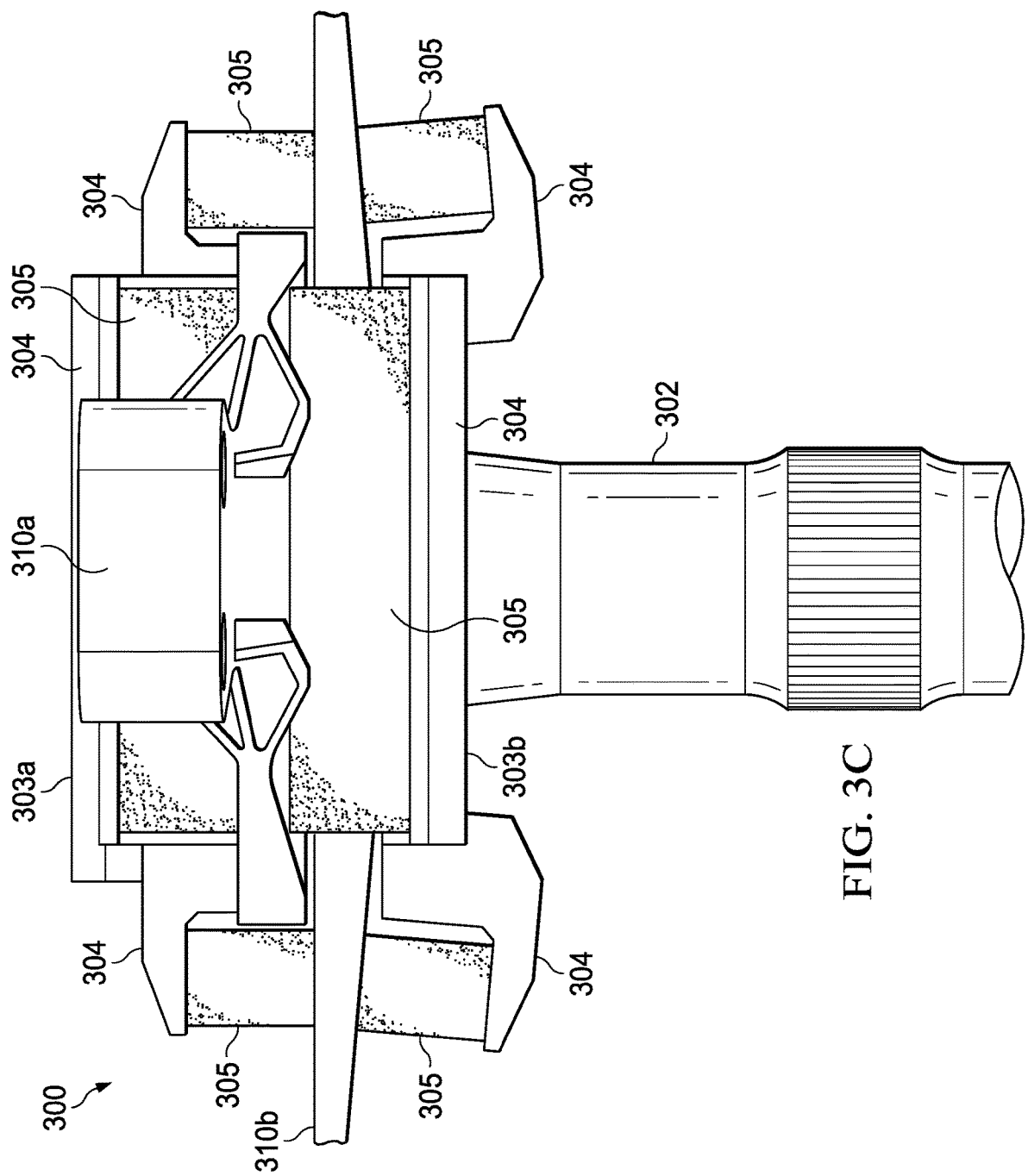

ROTOR HUB WITH STRUCTURAL REINFORCEMENTS

TECHNICAL FIELD

This disclosure relates generally to rotorcraft, and more particularly, though not exclusively, to rotor systems for rotorcraft.

BACKGROUND

Rotorcraft rely on rotor systems for flight capabilities, such as generating lift and providing control. A rotor system for a rotorcraft can be highly complex and may be implemented using a variety of designs. The design of a rotor system, however, implicates numerous performance considerations and can be a challenging aspect of rotorcraft design.

SUMMARY

According to one aspect of the present disclosure, a rotor hub comprises a hub plate, a yoke for attaching a plurality of rotor blades, a plurality of yoke support bearings, and a plurality of cushioned damper bearings for attaching a plurality of dampers.

BRIEF DESCRIPTION OF THE DRAWINGS

FIGS. 3A-E illustrate an example embodiment of a rotor hub with yoke support bearings.

DETAILED DESCRIPTION

Figure 1:
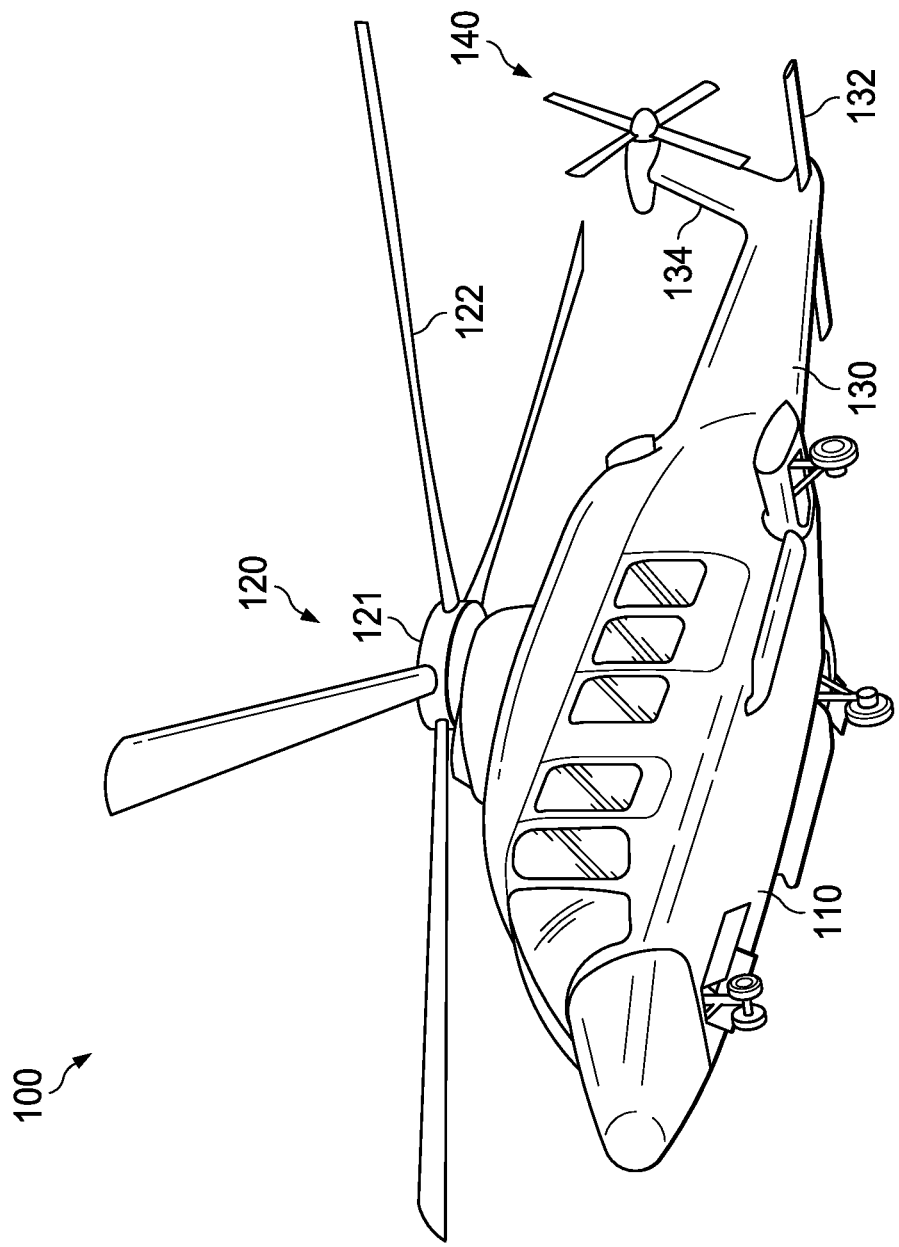
FIG. 1 illustrates an example rotorcraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a rotorcraft 100. Rotorcraft 100 includes a fuselage 110, a rotor system 120, and an empennage 130. The fuselage 110 is the main body of the rotorcraft, which may include a cabin (e.g., for crew, passengers, and/or cargo) and/or may house certain mechanical and electrical components (e.g., engine(s), transmission, and/or flight controls). The rotor system 120 is used to generate lift for rotorcraft 100. For example, the rotor system 120 includes a hub 121 coupled to a plurality of rotor blades 122, and torque generated by the engine(s) of the rotorcraft causes the rotor blades 122 to rotate, which in turn generates lift. Moreover, the pitch of each rotor blade 122 can be adjusted in order to selectively control direction, thrust, and lift for the rotorcraft. The empennage 130 of the rotorcraft includes a horizontal stabilizer 132, vertical stabilizer 134, and tail rotor 140. The horizontal stabilizer 132 and vertical stabilizer 134 respectively provide horizontal and vertical stability for the rotorcraft. Moreover, tail rotor system 140 may be used to provide anti-torque and/or direction control for the rotorcraft.

Rotorcraft 100 relies on rotor systems (e.g., main rotor system 120, tail rotor system 140) for flight capabilities, such as generating lift and providing control. Moreover, the rotor systems of rotorcraft 100 can be implemented using a variety of designs. The design of a rotor system, however, implicates numerous performance considerations (e.g., aerodynamics, weight, strength) and can be a challenging aspect of rotorcraft design. For example, a rotorcraft is subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor blades to flapping, leading and lagging, and bending. For example, flapping is a result of the dissymmetry of lift produced by rotor blades at different positions during a single rotation. During rotation, for example, a rotor blade may generate more lift while advancing in the direction of travel of the rotorcraft than while retreating in the opposite direction. Accordingly, a rotor blade may flap up while advancing in the direction of travel, and may flap down while retreating in the opposite direction. Similarly, a rotor blade may be subjected to a leading force that causes the blade to lead forward while advancing in the direction of travel, and a lagging force that causes the blade to lag backwards while retreating. Moreover, forces exerted on rotor blades may also subject them to bending. For example, the loads resulting from blade flapping and lead/lag forces may cause rotor blades to bend. In some cases, for example, lift and centrifugal force acting together (e.g., as upward and outward forces) may cause rotor blades to bend upwards or "cone."

These various forces can produce strains and stress on components of the rotor system, such as the rotor hub. The rotor hub may incur stress, for example, due to blade flapping, bending, aerodynamic shears, centrifugal force, and so forth. For example, centrifugal force may cause blade bending and shears to be concentrated near the mast attachment on the rotor hub yoke, resulting in high strains on that portion of the yoke. The various forces may also cause strains on the yoke near damper bearings. For example, in some embodiments, the yoke may include bearings for dampers that are used to suppress the reactions of certain forces, such as lead and lag forces. Other forces such as blade bending, however, may cause the vertical load on a damper bearing to react only in the inner portion of the yoke near the bearing hole. Accordingly, because the load is not introduced in a balanced pattern on the yoke, a "cupping" effect is introduced into the deflected shape of the yoke, which results in high strains. Excessive stress can damage a rotor hub and thus negatively impact its structural integrity, fatigue life, and performance. Accordingly, reducing the stress on a rotor hub during operation of a rotorcraft is an important design consideration.

Accordingly, the present disclosure describes embodiments of a rotor hub with various structural reinforcements. In some embodiments, for example, the rotor hub may include yoke support bearings. The yoke support bearings, for example, may be additional support bearings near the mast attachment of the yoke to provide additional structural support. In some embodiments, for example, a yoke support bearing may be an elastomeric bearing. In this manner, the yoke support bearings can reduce the bending moments and shears near the mast attachment of the yoke. In addition, in some embodiments, the rotor hub may include cushioned damper bearings. The cushioned damper bearings, for example, may include cushioned support plates for damper bearings on the yoke. In some embodiments, for example, a cushioned support plate may include a metal support plate reinforced by an elastomeric cushion. In this manner, the cushioned damper bearings can reduce the cupping effect on the yoke near the damper bearing holes. Accordingly, the yoke support bearings and cushioned damper bearings result in reduced strains on the rotor hub yoke. In this manner, the described embodiments reduce the stress sustained by a rotor hub during operation of a rotorcraft (e.g., by at least 10%), thus improving the structural integrity, fatigue life, and reliability of the rotor hub.

Example embodiments are described below with more particular reference to the remaining FIGURES. It should be appreciated that rotorcraft 100 of FIG. 1 is merely illustrative of a variety of aircraft that can be used with embodiments described throughout this disclosure. Other aircraft implementations can include, for example, hybrid aircraft, tiltrotor aircraft, unmanned aircraft, gyrocopters, a variety of helicopter configurations, fixed wing airplanes, and drones, among other examples. Moreover, the described embodiments can also be used for other non-aircraft implementations, including land, water, and/or space-based vehicles, among other examples.

FIGS. 2A-E illustrate an example embodiment of a rotor hub 200 with cushioned damper bearings 215. In some embodiments, for example, rotor hub 200 could be used to implement a rotor system for a rotorcraft (e.g., rotor system 120 of rotorcraft 100 from FIG. 1).

Figure 2A:
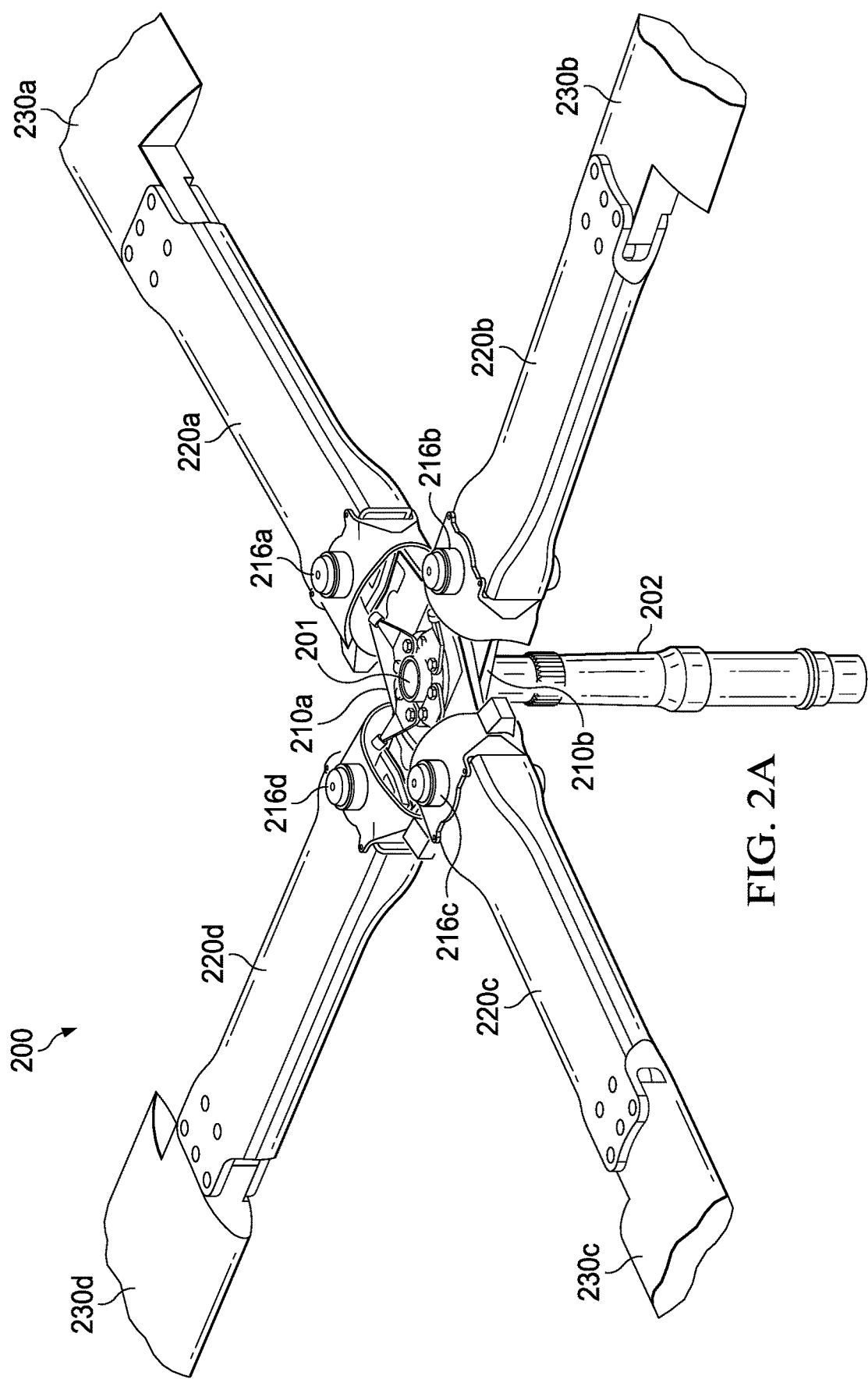
FIGS. 2A-E illustrate an example embodiment of a rotor hub with cushioned damper bearings.
Figure 2B:
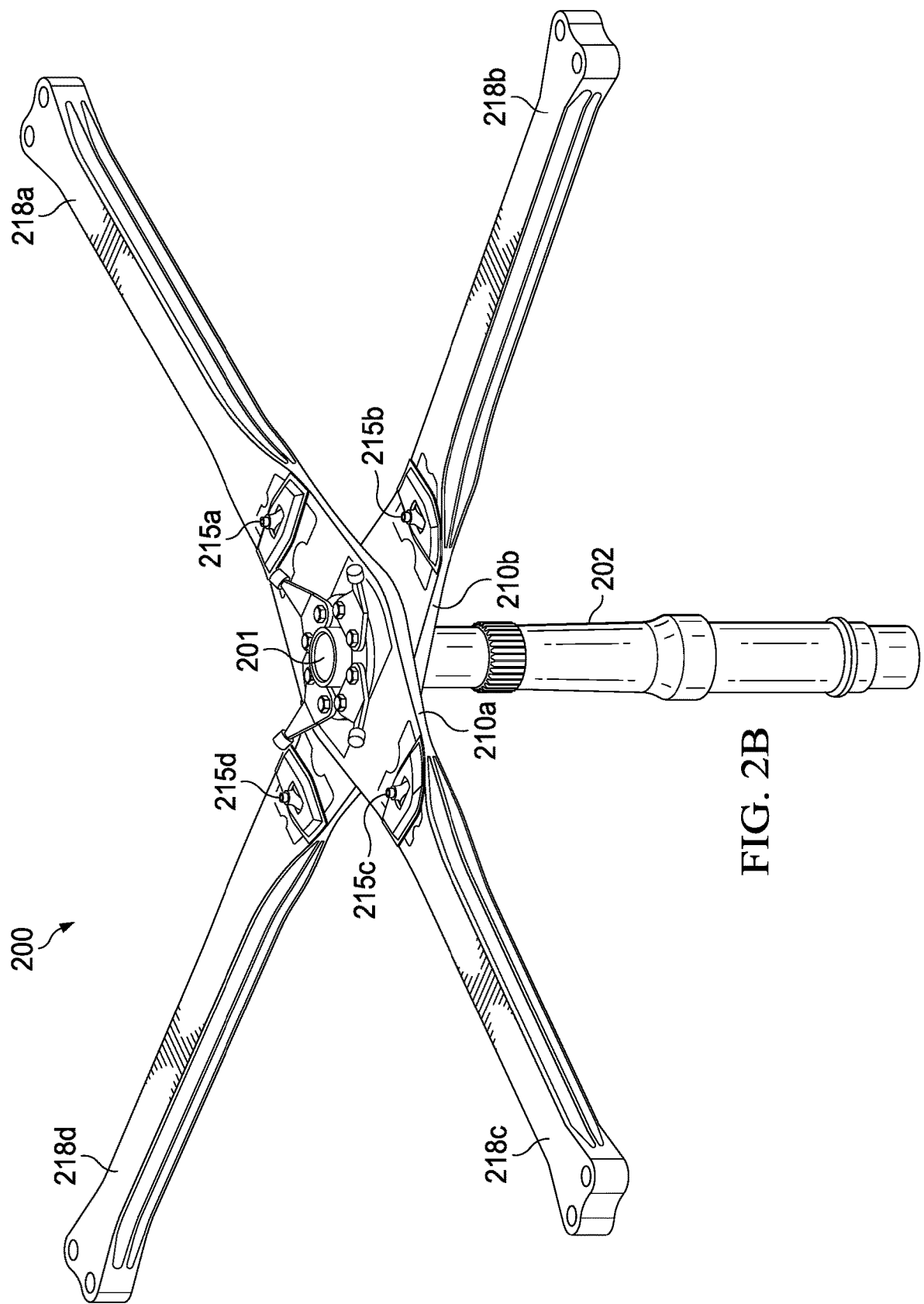
Figure 2C:
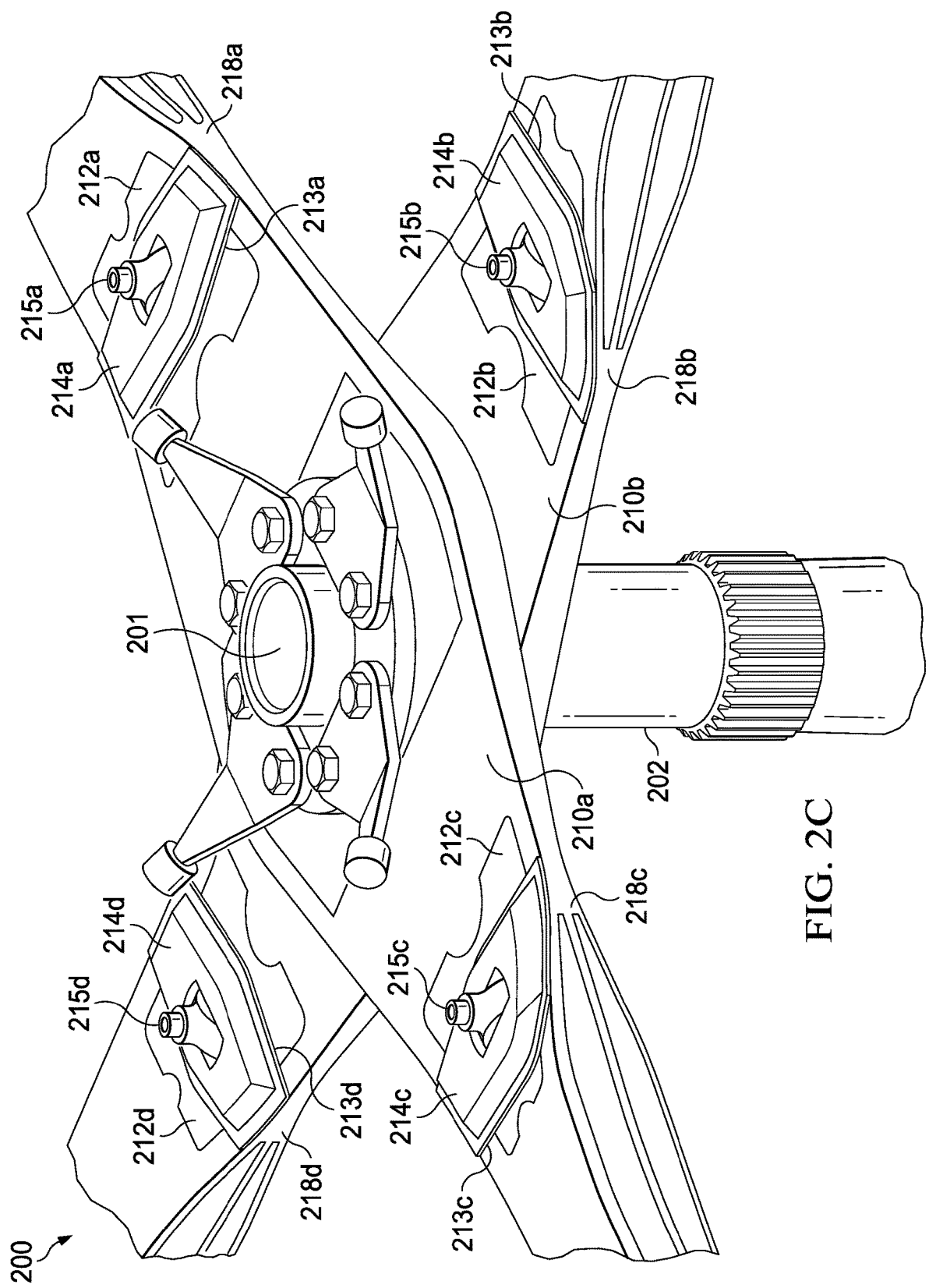
Figure 2D:
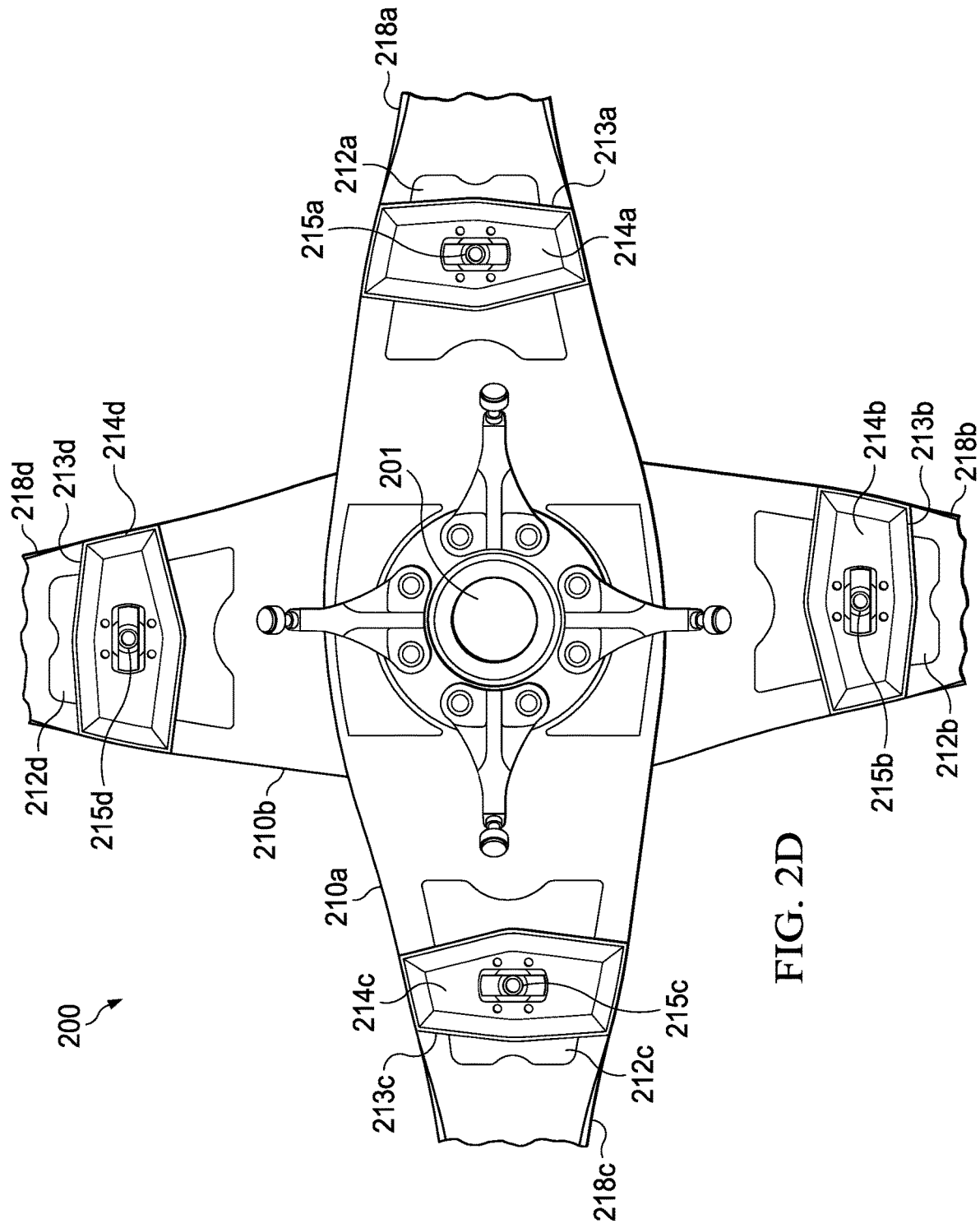
Figure 2E:
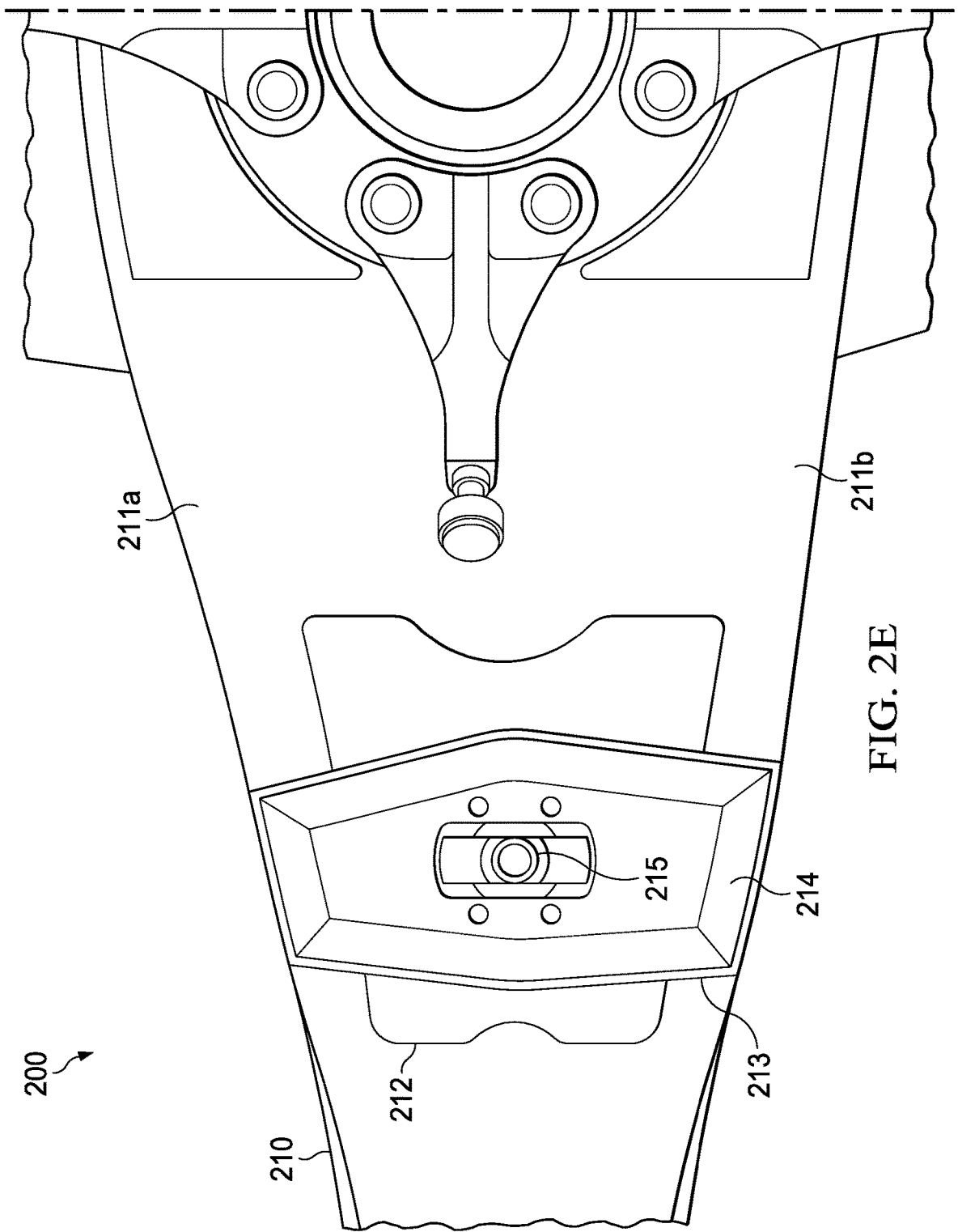
Figure 3A:
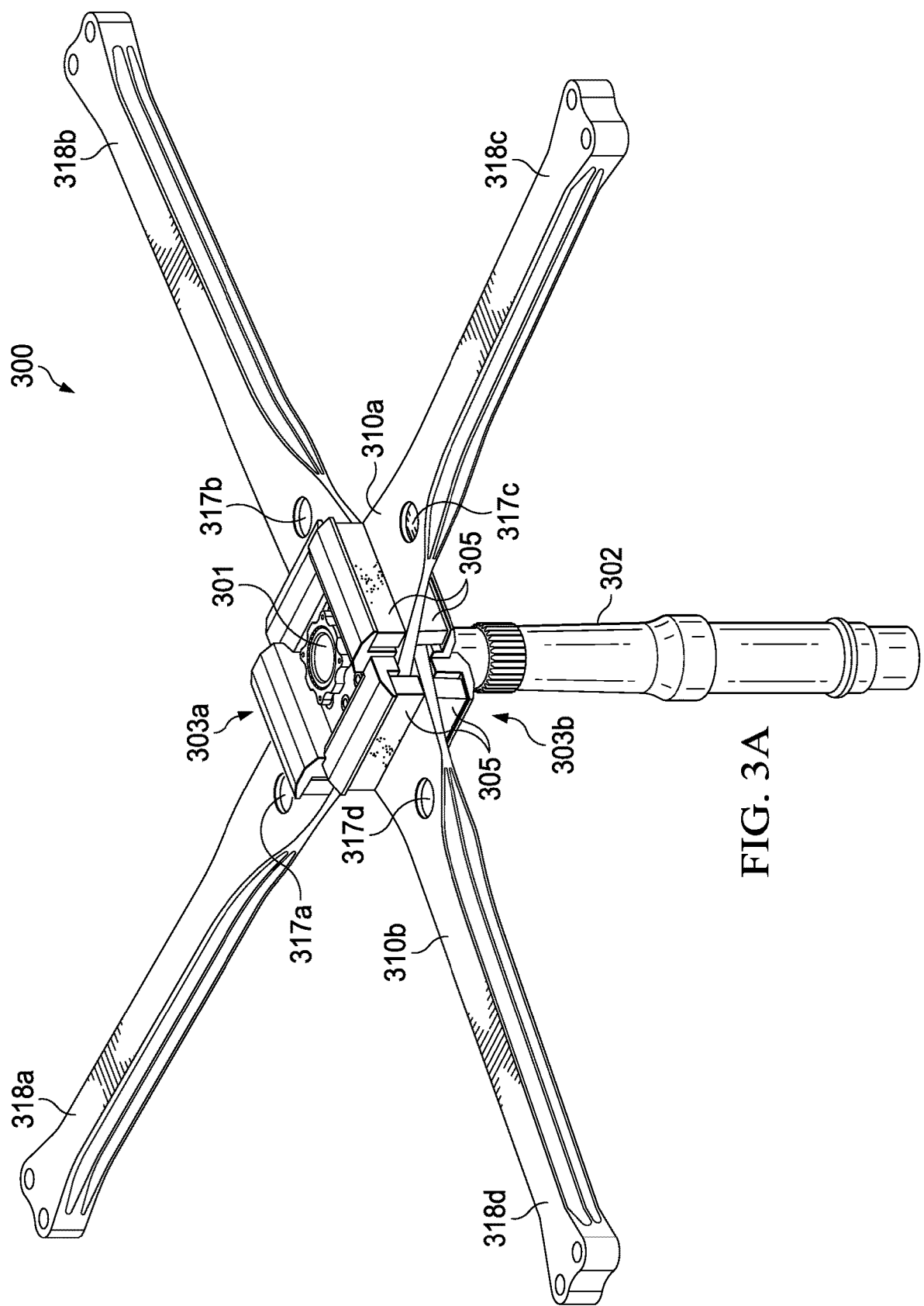
Figure 3B:
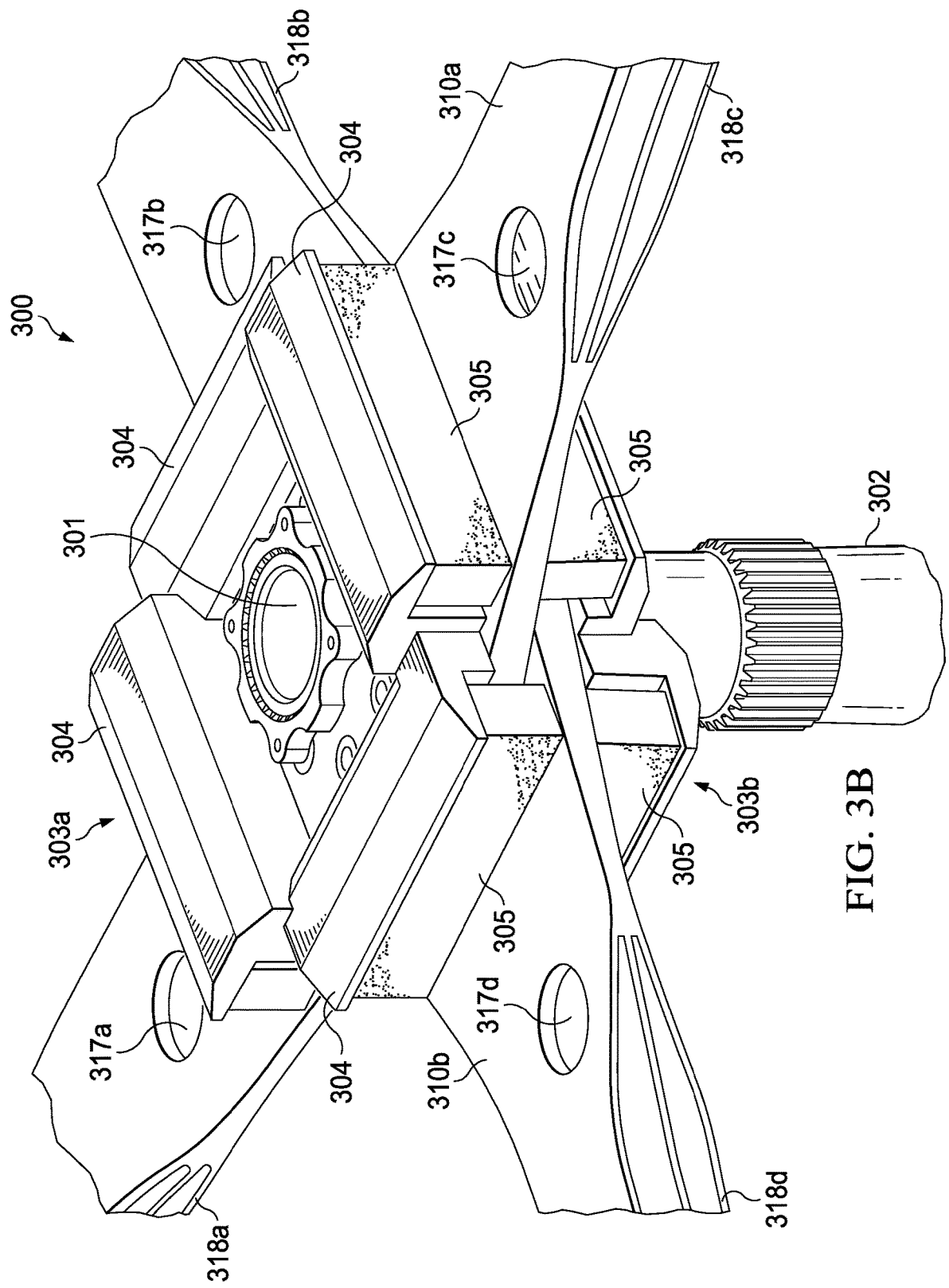
Figure 3D:
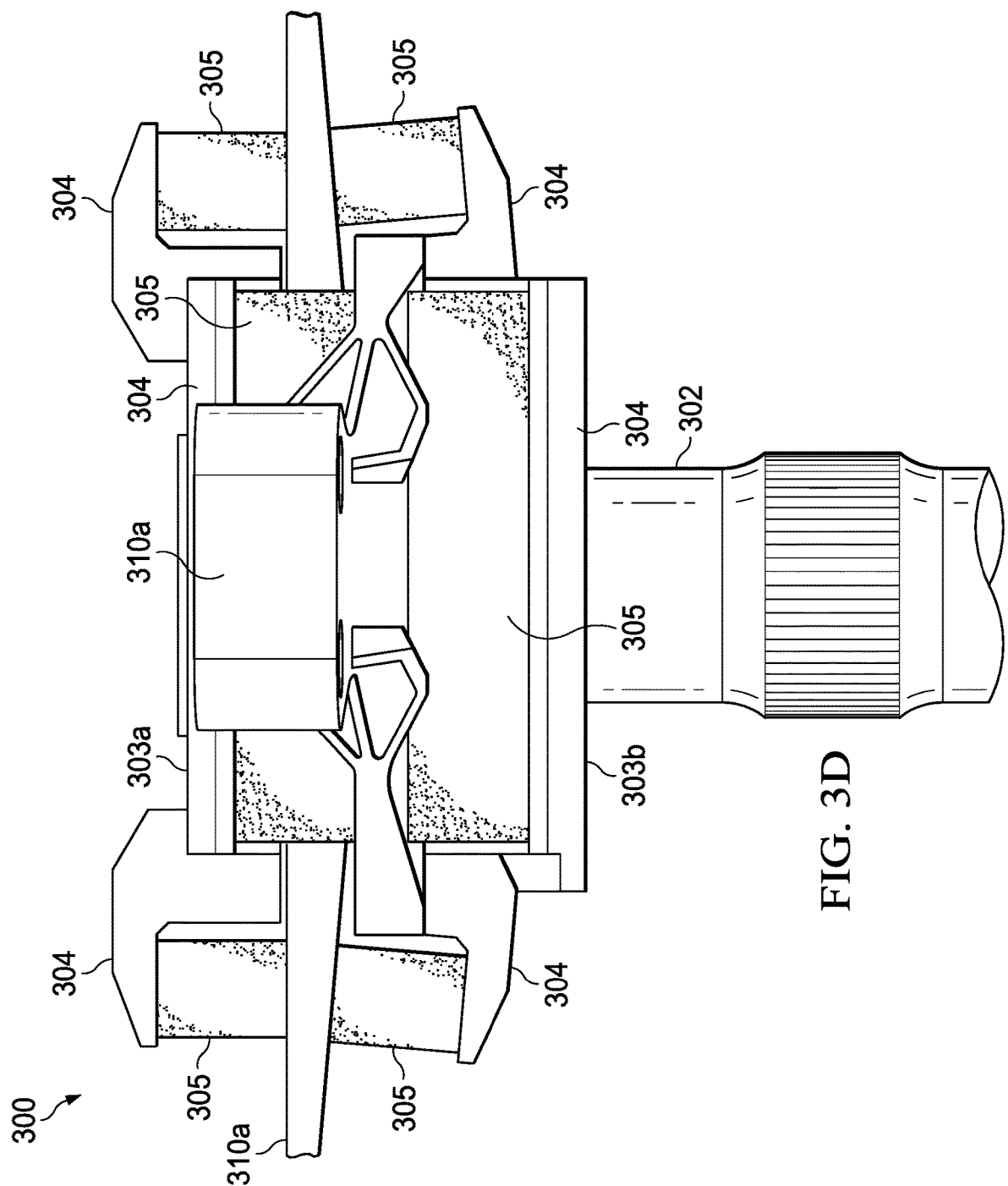
Figure 3E:
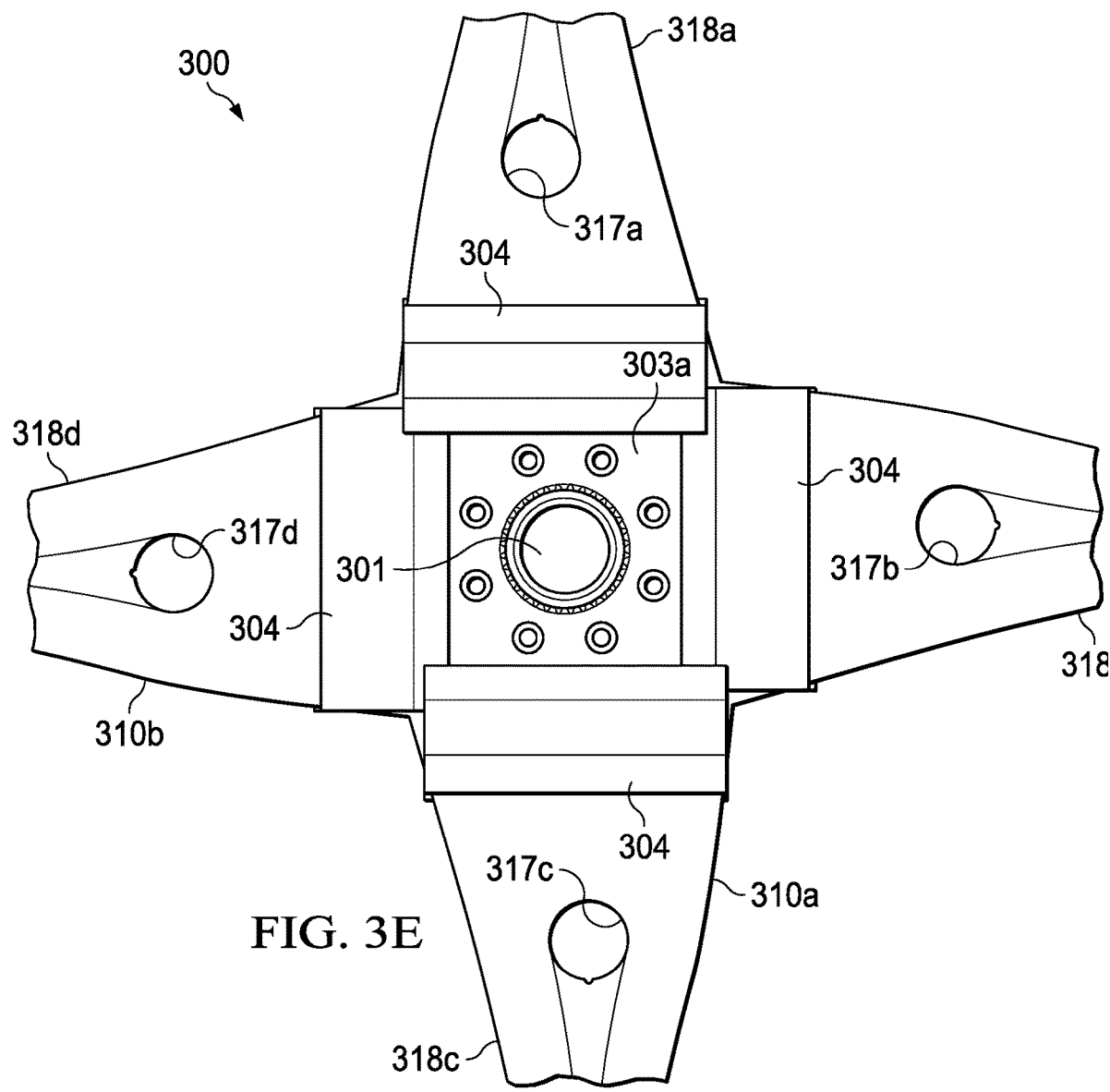

In the illustrated embodiment, rotor hub 200 includes a mast attachment aperture 201 and yoke 210. Mast attachment aperture 201 is an aperture that allows a rotor mast 202 to interface with rotor hub 200. Moreover, yoke 210 is formed using two yokes 210a and 210b that are stacked perpendicularly, thus forming four yoke arms 218a-d that can be used to attach rotor blades 230a-d. For example, each yoke arm 218 can be used to attach a rotor blade 230 and corresponding blade grip 220 to rotor hub 200 (as shown in FIG. 2A). Yoke arms 218 can also be used to attach a plurality of dampers 216a-d (as shown in FIG. 2A). Dampers 216, for example, can be used to suppress reactions of certain forces, such as lead and lag forces. Accordingly, yoke arms 218 also include a plurality of bearings 215a-d for attaching dampers 216. In some embodiments, for example, bearings 215 may be shear bearings, and may be embedded into holes in the arms 218 of the yoke 210.

The portions of the yoke 210 near the holes for damper bearings 215, however, can suffer strains from various forces during operation of a rotorcraft. Moreover, existing rotor hub designs are susceptible to permanent damage from these strains, which can reduce their lifespan. For example, with respect to existing rotor hub designs, blade bending can cause the vertical load on damper bearings to react only in the inner portion of the yoke near the bearing holes. Accordingly, because the load is not introduced in a balanced pattern on the yoke, a "cupping" effect is introduced into the deflected shape of the yoke, which results in high strains. Moreover, the stress resulting from these strains can damage a rotor hub and thus negatively impact its structural integrity, fatigue life, and performance.

Accordingly, rotor hub 200 includes various structural reinforcements to reduce the strains (e.g., shear strains) caused by cupping near the damper bearings 215 on the yoke 210. For example, the damper bearings 215 of rotor hub 200 are cushioned damper bearings. Each cushioned damper bearing 215, for example, includes a cushioned support plate between the damper bearing 215 and the yoke 210. The cushioned support plate, for example, may include a metal support plate 214 reinforced by an elastomeric cushion 213. The elastomeric cushion 213, for example, may be formed using a combination of elastomers (e.g., rubber) and high-strength material(s) (e.g., metal), which may be designed to achieve desired structural properties (e.g., stiffness, compression, and/or damping properties). Moreover, in some embodiments, the elastomeric cushion 213 may be positioned between the support plate 214 and the yoke 210. In addition, rather than merely covering the hole in the yoke 210 that houses the damper bearing 215, the support plate 214 and cushion 213 may span a larger portion of the yoke 210 beyond the bearing hole. In this manner, the larger support plate 214 causes loads to be distributed over a larger portion of the yoke 210 rather than being concentrated near the hole in the yoke 210 for the damper bearing 215. In some embodiments, for example, a yoke 210 may be designed using a variety of different materials for different portions of the yoke 210. In some embodiments, for example, the outer portions of a yoke 210 may be formed by wrapping composite materials (e.g., fiberglass) to form belted regions 211a,b. Moreover, the yoke 210 may include separate composite patches 212 for the damper bearings 215. Accordingly, in some embodiments, a support plate 214 for a damper bearing 215 may extend beyond a composite patch 212 and into the belted regions 211 near the edges of a yoke 210, thus causing loads to be introduced in the belted regions 211 of the yoke 210. The elastomeric cushion 213 then provides an additional layer of support for absorbing those loads. In this manner, the cushioned support plates 214 can reduce the cupping effect on the yoke 210 near the holes for the damper bearings 215.

Accordingly, the design of rotor hub 200 minimizes cupping and thus reduces shear strains on the yoke 210 near the damper bearing 215 holes. In this manner, rotor hub 200 is subjected to reduced strains during operation of a rotorcraft, thus improving its structural integrity, fatigue life, performance, and reliability. The described rotor hub design is particularly advantageous for reducing shear strains on a bearingless rotor hub yoke. Moreover, because these reduced strains can be achieved without impacting the existing flapping angle of the rotor blades 230, the lifespan of rotor hub 200 is lengthened without reducing its performance.

FIGS. 3A-E illustrate an example embodiment of a rotor hub 300 with yoke support bearings. In some embodiments, for example, rotor hub 300 could be used to implement a rotor system for a rotorcraft (e.g., rotor system 120 of rotorcraft 100 from FIG. 1).

In the illustrated embodiment, rotor hub 300 includes a mast attachment aperture 301, hub plates 303, and yoke 310. Mast attachment aperture 301 is an aperture that allows a rotor mast 302 to interface with rotor hub 300. Hub plates 303 include an upper hub plate 303a and lower hub plate 303b. In some embodiments, for example, hub plates 303a,b may be rigid plates formed using a high-strength material, such as metal (e.g., steel). Yoke 310 is formed using two yokes 310a and 310b that are stacked perpendicularly, thus forming four yoke arms 318a-d that can be used for attaching rotor blades to rotor hub 300. Each yoke arm 318, for example, can be used to attach a rotor blade and corresponding blade grip to rotor hub 300.

Various forces can produce strains and stress on a rotor hub during operation of a rotorcraft. For example, existing rotor hubs may incur high strains near the mast attachment due to various forces, such as blade flapping, bending, aerodynamic shears, centrifugal force, and so forth. For example, with respect to existing rotor hubs, centrifugal force may cause blade bending and shears to be concentrated on the yoke near the mast attachment of the rotor hub, resulting in high strains on that portion of the yoke. Moreover, these strains can result in permanent damage that can reduce the lifespan of existing rotor hubs.

Accordingly, rotor hub 300 includes various structural reinforcements to reduce the strains caused by shears and moments near the mast attachment 301 on the yoke 310. In the illustrated embodiment, for example, rotor hub 300 includes a plurality of yoke support bearings 305. Yoke support bearings 305 are support bearings (e.g., elastomeric bearings and/or springs) that provide additional structural support for the yoke 310 near the mast attachment 301 of rotor hub 300. In the illustrated embodiment, for example, yoke support bearings 305 are positioned on rotor hub 300 both above and below the yoke 310, outboard of the mast attachment 301. In this manner, yoke support bearings 305 provide additional shear support outboard of the mast attachment 301, thus reducing the shears and moments (e.g., bending moments) on the yoke 310 near the mast attachment 301. As an example, during blade flapping, yoke support bearings 305 serve to modify the bent shape of the composite yoke beam to reduce bending near mast attachment 301, thus reducing the associated strains on yoke 310 near mast attachment 301. In this manner, yoke support bearings 305 similarly reduce the cupping that may result from blade flapping and bending (e.g., due to the shape of the yoke 310 and the curved support at the mast attachment 301). For example, as explained in connection with FIGS. 2A-E, blade flapping and/or bending can cause the vertical load on bearings used to attach dampers (e.g., shear bearings) to react only near the holes 317 in the yoke 310 for those bearings, thus introducing a "cupping" effect into the deflected shape of the yoke 310. However, by using yoke support bearings 305 to reduce the bending that occurs near mast attachment 301, the degree of cupping that results is also reduced, thus minimizing the strains that result from cupping near the holes 317 in the yoke 310 for the damper bearings.

In some embodiments, yoke support bearings 305 may be implemented using an elastomeric material. The elastomeric material, for example, may be formed using a combination of elastomers and high-strength material (e.g., rubber and metal) designed to achieve desired structural properties, such as stiffness, compression, and/or damping properties. In some embodiments, for example, yoke support bearings 305 may be implemented as spring bearings, such as an elastomeric spring. Moreover, in some embodiments, yoke support bearings 305 may be designed as compression-based bearings and/or shear-based bearings. For example, in some embodiments, yoke support bearings 305 could be implemented using compression bearing 400 of FIG. 4, shear bearing 500 of FIG. 5, and/or a combination of both.

Moreover, in some embodiments, yoke support bearings 305 may be fastened to rotor hub 300 using rigid plates or brackets. For example, in the illustrated embodiment, yoke support bearings 305 are fastened to rotor hub 300 using brackets 304 associated with the hub plates 303. Each hub plate 303, for example, includes a plurality of brackets 304 associated with the arms 318 of yoke 310. For example, upper hub plate 303a includes four upper brackets 304 associated with the four arms 318 of yoke 310, and lower hub plate 303b similarly includes four lower brackets 304. Moreover, each bracket 304 is used to fasten a yoke support bearing 305 to rotor hub 300. In the illustrated embodiment, for example, each bracket 304 fastens a yoke support bearing 305 between the particular bracket 304 and the yoke 310. Accordingly, four yoke support bearings 305 are fastened above the yoke 310 using upper brackets 304, and four yoke support bearings 305 are similarly fastened below the yoke 310 using lower brackets 304. In this manner, yoke support bearings 305 serve to reduce bending moments and shears on the yoke 310 near the mast attachment 301.

Accordingly, rotor hub 300 is designed to reduce bending moments and shears near the mast attachment 301 on the yoke 310. As a result, shear strains on the yoke 310 near the mast attachment 301 are reduced. Moreover, the degree of cupping that results is also reduced, thus reducing the strains that result from cupping near the holes 317 in the yoke 310 for damper bearings. In this manner, rotor hub 300 is subjected to reduced strains during operation of a rotorcraft, thus improving its structural integrity, fatigue life, performance, and reliability. The described rotor hub design is particularly advantageous for reducing shear strains on a bearingless rotor hub yoke. Moreover, because these reduced strains can be achieved without impacting the existing flapping angle of the rotor blades, the lifespan of rotor hub 300 is lengthened without reducing its performance.

Figure 4A:
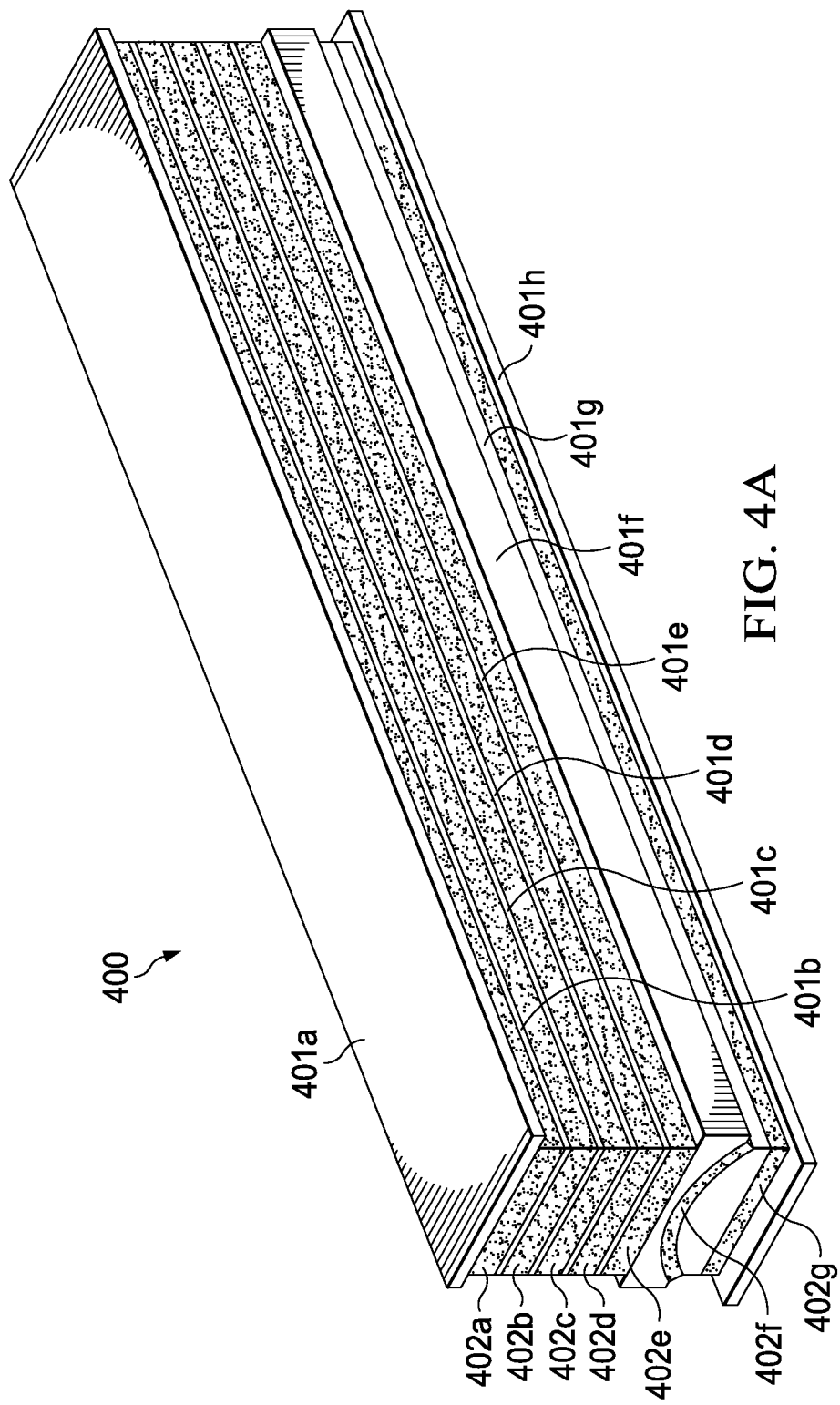
FIGS. 4A-C illustrate an example embodiment of a compression support bearing for a rotor hub.
Figure 4B:
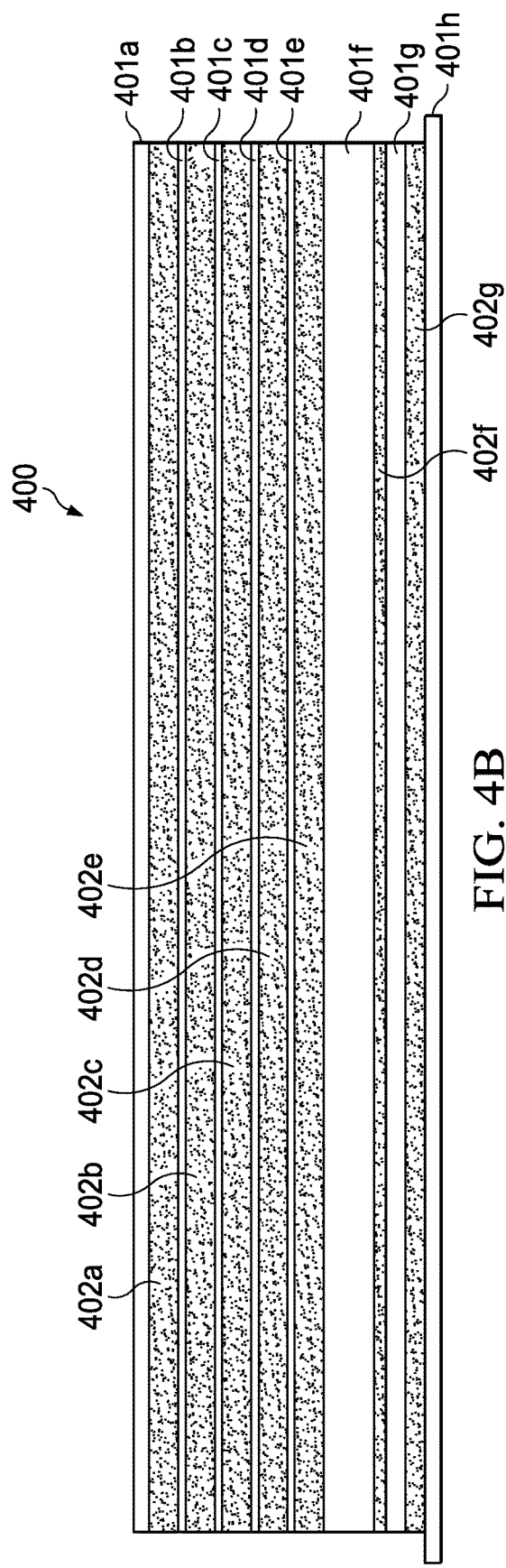
Figure 4C:
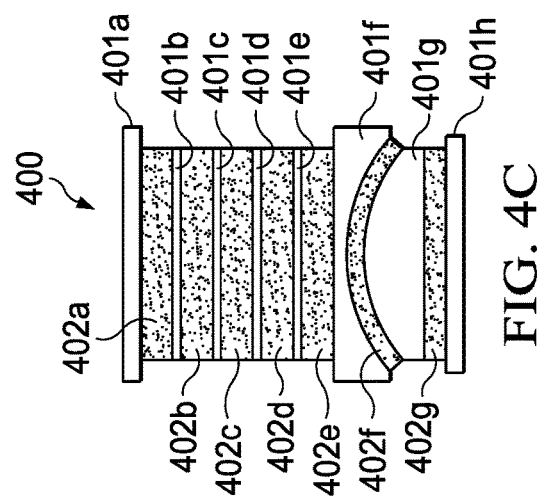

FIGS. 4A-C illustrate an example embodiment of a compression support bearing 400 for a rotor hub. In some embodiments, for example, compression bearing 400 may be used to provide structural support for the yoke of a rotor hub. For example, in some embodiments, compression bearing 400 may be used to implement yoke support bearings for a rotor hub, such as yoke support bearings 305 from rotor hub 300 of FIG. 3, and/or yoke support bearings 605 from rotor hub 600 of FIG. 6.

In the illustrated embodiment, compression bearing 400 is designed as a compression-based bearing formed using elastomeric materials. In some embodiments, compression bearing 400 may be a spring, such as an elastomeric spring. The elastomeric materials used to implement compression bearing 400 include a combination of elastomeric and rigid materials (e.g., rubber and metal) designed to achieve certain structural properties. In particular, compression bearing 400 is implemented using elastomeric materials designed to achieve stiffness, compression, and damping properties that are suitable for structurally supporting a rotor hub.

In the illustrated embodiment, for example, compression bearing 400 is implemented using layers of rigid sections 401 and elastomeric sections 402. In some embodiments, for example, the rigid sections 401a-h may be formed using high-strength rigid materials, such as metal (e.g., aluminum, titanium, stainless steel), fiberglass, and/or any other suitable high-strength material. Moreover, the elastomeric sections 402a-g may be formed using elastomeric materials, such as rubber and/or any other suitable type of elastomers. Moreover, the particular arrangement of rigid sections 401 and elastomeric sections 402 used to implement compression bearing 400 (as illustrated by FIG. 4) is designed to achieve structural properties that are suitable for supporting the yoke of a rotor hub.

Figure 5A:
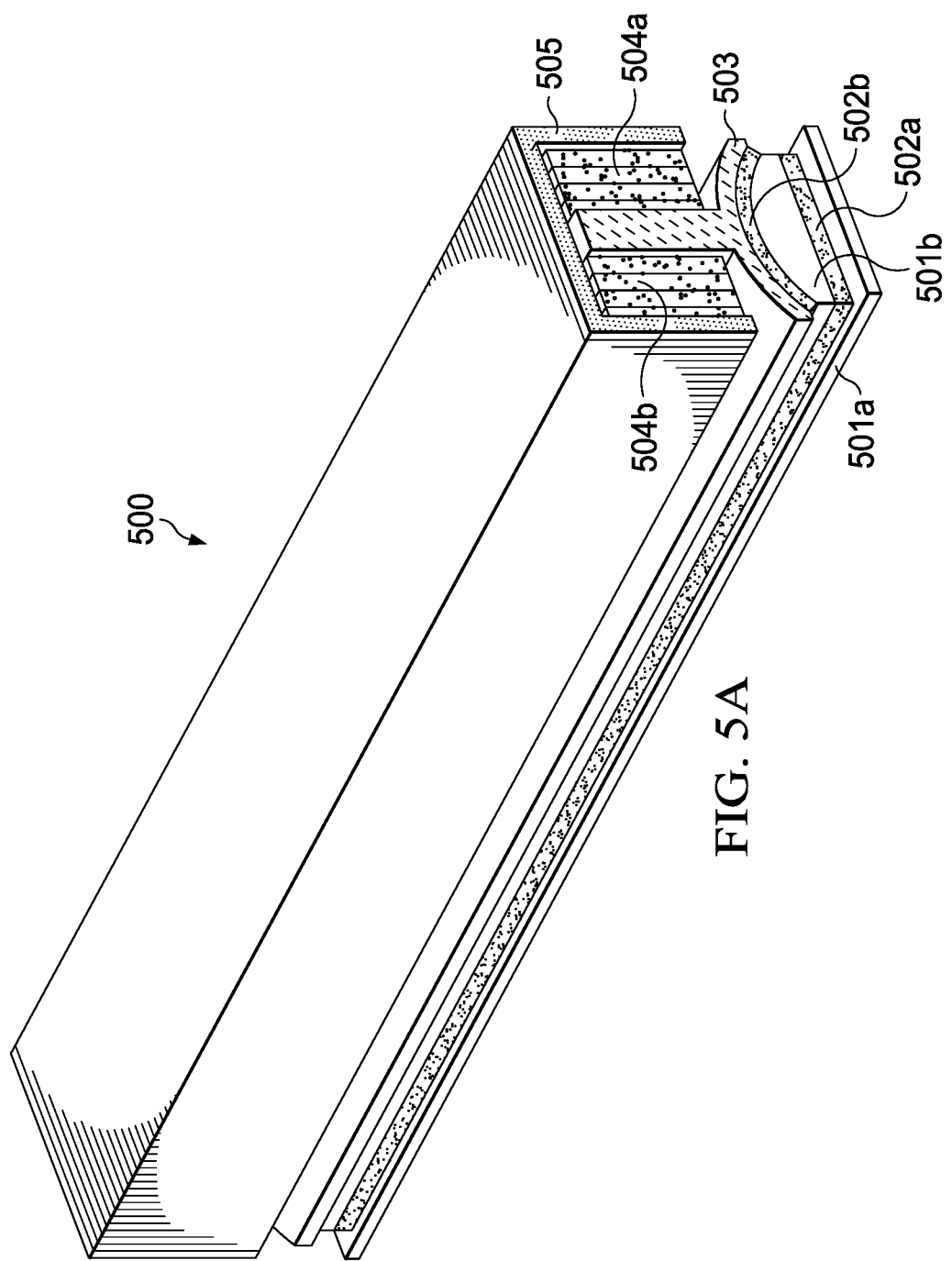
FIGS. 5A-C illustrate an example embodiment of a shear support bearing for a rotor hub.
Figure 5B:
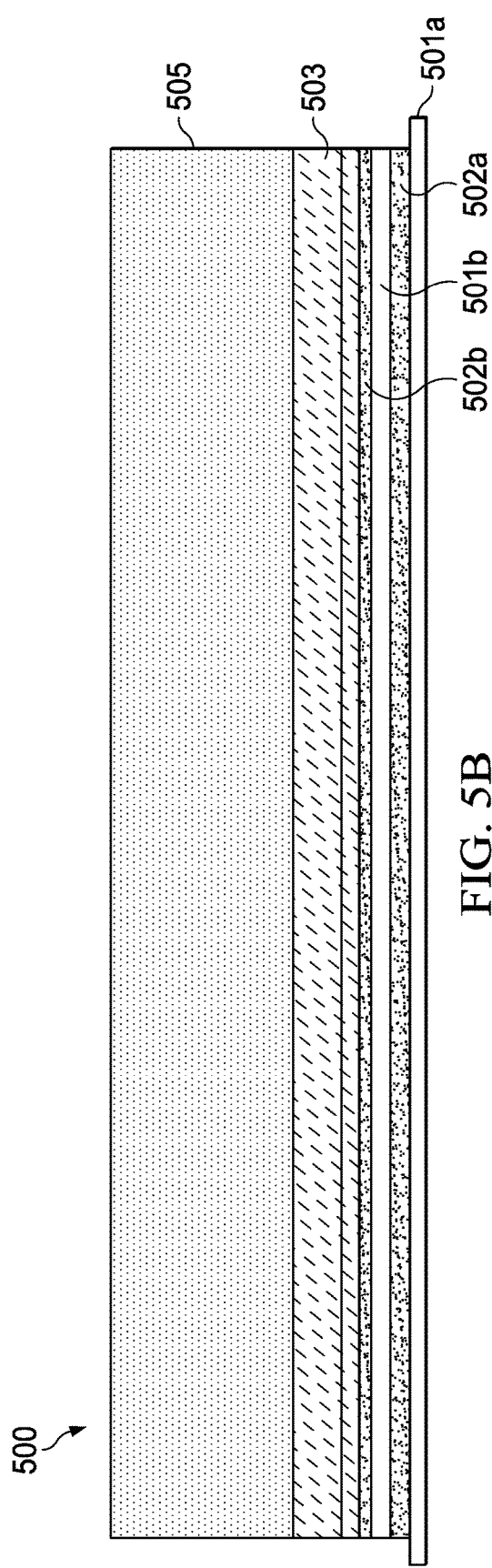
Figure 5C:
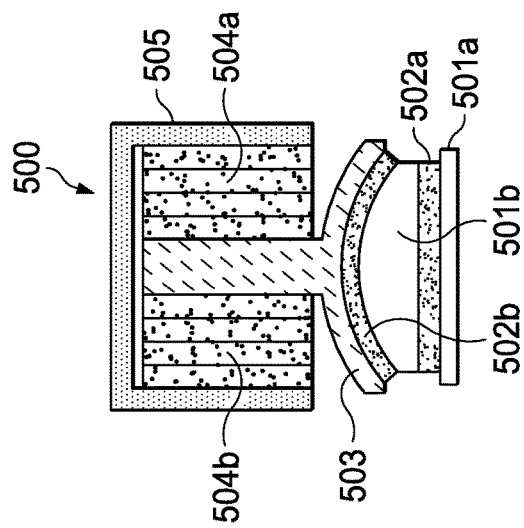

FIGS. 5A-C illustrate an example embodiment of a shear support bearing 500 for a rotor hub. In some embodiments, for example, shear bearing 500 may be used to provide structural support for the yoke of a rotor hub. For example, in some embodiments, shear bearing 500 may be used to implement yoke support bearings for a rotor hub, such as yoke support bearings 305 from rotor hub 300 of FIG. 3, and/or yoke support bearings 605 from rotor hub 600 of FIG. 6.

In the illustrated embodiment, shear bearing 500 is designed as a shear-based bearing formed using elastomeric materials. In some embodiments, shear bearing 500 may be a spring, such as an elastomeric spring. The elastomeric materials used to implement shear bearing 500 include a combination of elastomeric and rigid materials (e.g., rubber and metal) designed to achieve certain structural properties. In particular, shear bearing 500 is implemented using elastomeric materials designed to achieve stiffness, compression, and damping properties that are suitable for structurally supporting a rotor hub.

In the illustrated embodiment, for example, shear bearing 500 is implemented using various rigid and elastomeric sections 501-505. Moreover, the particular arrangement of rigid and elastomeric sections 501-505 used to implement shear bearing 500 (as illustrated by FIG. 5) is designed to achieve structural properties that are suitable for supporting the yoke of a rotor hub.

In the illustrated embodiment, for example, the rigid sections of shear bearing 500 include lower rigid sections 501a,b, middle rigid section 503, and upper rigid section 505, which may be formed using rigid materials. The elastomeric sections of shear bearing 500 include lower elastomeric sections 502a,b and middle elastomeric sections 504a,b. Moreover, in some embodiments, there may be an air gap separating middle rigid section 503 and middle elastomeric sections 504 from the top portion of upper rigid section 505, thus allowing the middle elastomeric sections 504 to shear in response to movement from the yoke.

In some embodiments, lower elastomeric sections 502a,b may be formed using an elastomeric material, while middle elastomeric sections 504a,b may be formed using a combination of elastomeric and rigid materials. In some embodiments, elastomeric materials of shear bearing 500 may include rubber and/or any other suitable type of elastomers. Moreover, rigid materials of shear bearing 500 may include high-strength materials such as metal (e.g., aluminum, titanium, stainless steel), fiberglass, and/or any other suitable high-strength material.

Figure 6:
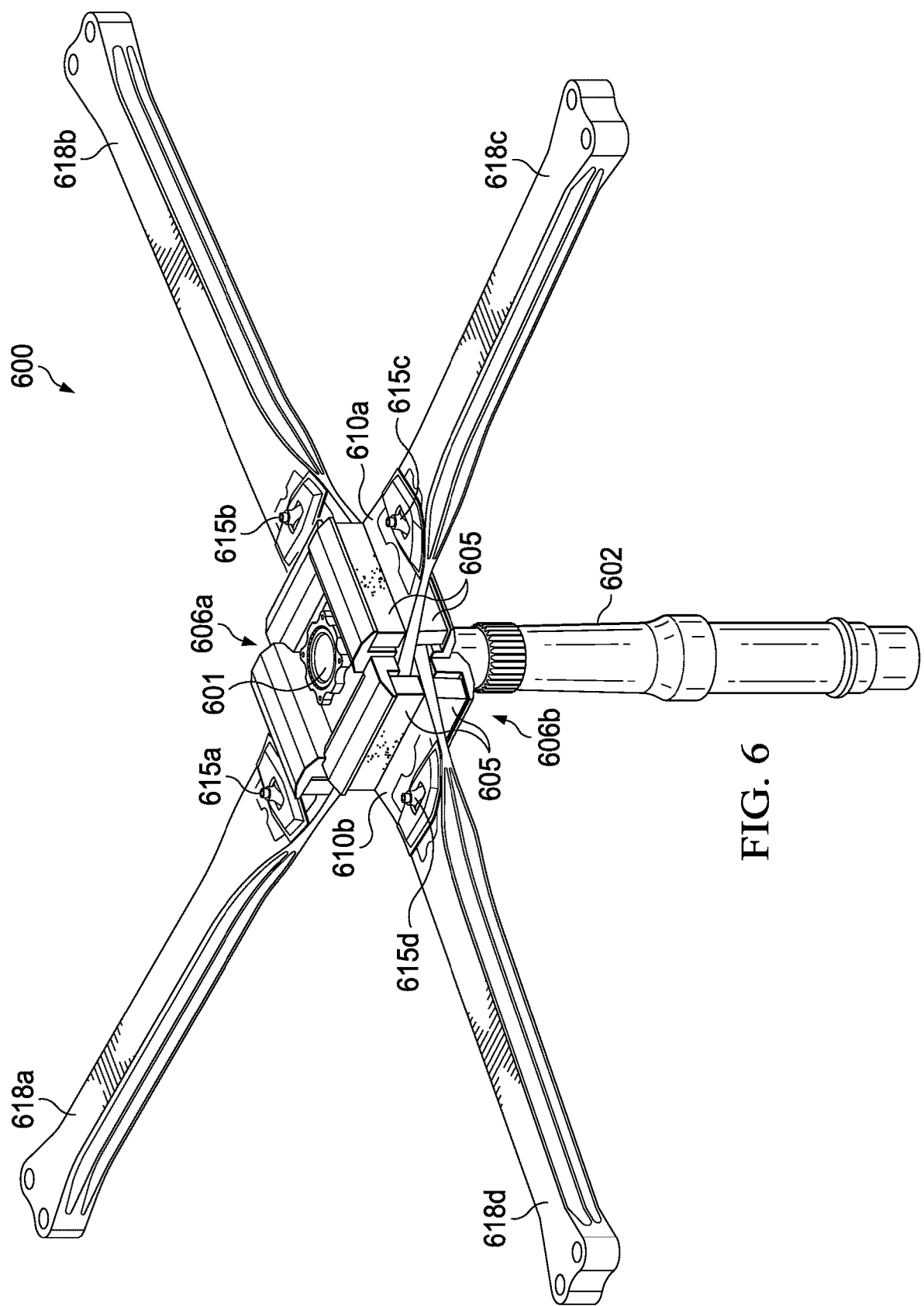
FIG. 6 illustrates an example embodiment of a rotor hub with structural reinforcements.

FIG. 6 illustrates an example embodiment of a rotor hub 600 with structural reinforcements. In some embodiments, for example, rotor hub 600 could be used to implement a rotor system for a rotorcraft (e.g., rotor system 120 of rotorcraft 100 from FIG. 1). Rotor hub 600 includes aspects of rotor hub 200 from FIGS. 2A-E and rotor hub 300 from FIGS. 3A-E. In the illustrated embodiment, for example, rotor hub 600 includes cushioned damper bearings 615 and yoke support bearings 605. Cushioned damper bearings 615 may be similar to cushioned damper bearings 215 from FIGS. 2A-E, and yoke support bearings 605 may be similar to yoke support bearings 305 from FIGS. 3A-E. The remaining components of rotor hub 600 are similar to the similarly labeled components of rotor hub 200 from FIGS. 2A-E and rotor hub 300 from FIGS. 3A-E. In this manner, the design of rotor hub 600 leverages the combined structural benefits of both cushioned damper bearings and yoke support bearings, such as reduced strains and improved fatigue life, as described above in connection with FIGS. 2A-E and FIGS. 3A-E.

The FIGURES illustrate the architecture, functionality, and operation of possible implementations of various embodiments of the present disclosure. Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for"

or "steps for" are explicitly used in the particular claims; and (b) Applicant does not intend, by any statement in the specification, to limit this disclosure in any way that is not otherwise expressly reflected in the appended claims.

What is claimed is:

1. A rotor hub, comprising:
   a hub plate;
   a yoke configured for attaching a plurality of rotor blades;
   a plurality of yoke support bearings; and
   a plurality of cushioned damper bearings configured for attaching a plurality of dampers, wherein each of the cushioned damper bearings further comprises a bearing support plate positioned between a damper attachment bearing and a cushion.

2. The rotor hub of claim 1, wherein the hub plate comprises a plurality of brackets, wherein the plurality of brackets is configured to fasten the plurality of yoke support bearings between the hub plate and the yoke.

3. The rotor hub of claim 1, wherein each yoke support bearing of the plurality of yoke support bearings comprises an elastomeric bearing.

4. The rotor hub of claim 3, wherein the elastomeric bearing comprises a spring.

5. The rotor hub of claim 4, wherein the spring comprises a compression spring.

6. The rotor hub of claim 1, wherein the damper attachment bearing comprises a shear bearing.

7. The rotor hub of claim 1, wherein the cushion comprises an elastomeric cushion.

8. The rotor hub of claim 1, wherein the bearing support plate extends near an edge of the yoke.

9. A rotorcraft, comprising:
   a rotor mast;
   a plurality of rotor blades; and
   a rotor hub, comprising:
     a hub plate;
     a yoke coupled to the plurality of rotor blades;
     a plurality of yoke support bearings; and
     a plurality of cushioned damper bearings coupled to the plurality of dampers, wherein each of the cushioned damper bearings further comprises a bearing support plate positioned between a damper attachment bearing and a cushion.

10. The rotorcraft of claim 9, wherein the hub plate comprises a plurality of brackets, wherein the plurality of brackets is configured to fasten the plurality of yoke support bearings between the hub plate and the yoke.

11. The rotorcraft of claim 9, wherein each yoke support bearing of the plurality of yoke support bearings comprises an elastomeric bearing.

12. The rotorcraft of claim 11, wherein the elastomeric bearing comprises a shear spring.

13. A rotor hub, comprising:
    a hub plate;
    a yoke configured for attaching a plurality of rotor blades;
    a plurality of yoke support bearings, wherein each of the yoke support bearings comprises a shear spring; and
    a plurality of cushioned damper bearings configured for attaching a plurality of dampers.

14. The rotor hub of claim 13, wherein the hub plate comprises a plurality of brackets, wherein the plurality of brackets is configured to fasten the plurality of yoke support bearings between the hub plate and the yoke.

15. The rotor hub of claim 13, wherein each cushioned damper bearing of the plurality of cushioned damper bearings comprises:
    a damper attachment bearing; and a cushion.

16. The rotor hub of claim 15, wherein the damper attachment bearing comprises a shear bearing.

17. The rotor hub of claim 15, wherein the cushion comprises an elastomeric cushion.

18. The rotor hub of claim 15, wherein each cushioned damper bearing of the plurality of cushioned damper bearings further comprises a bearing support plate positioned between the damper attachment bearing and the cushion.

19. The rotor hub of claim 18, wherein the bearing support plate extends near an edge of the yoke.

* * * * *